United States Patent
Lee

(10) Patent No.: US 8,270,903 B2
(45) Date of Patent: Sep. 18, 2012

(54) METHOD FOR DISPLAYING INFORMATION IN MOBILE COMMUNICATION TERMINAL USING BLUETOOTH

(75) Inventor: Hung Pil Lee, Gumi-si (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 950 days.

(21) Appl. No.: 11/755,838

(22) Filed: May 31, 2007

(65) Prior Publication Data

US 2008/0085740 A1    Apr. 10, 2008

(30) Foreign Application Priority Data

Oct. 9, 2006    (KR) .................. 10-2006-0097748

(51) Int. Cl.
*H04B 7/00*    (2006.01)
(52) U.S. Cl. ...................... 455/41.2; 455/566
(58) Field of Classification Search ............... 455/41.1, 455/41.2, 41.3, 566
See application file for complete search history.

(56) References Cited

U.S. PATENT DOCUMENTS

| | | | |
|---|---|---|---|
| 2006/0276133 A1* | 12/2006 | Ly et al. ................ | 455/41.2 |
| 2007/0141988 A1* | 6/2007 | Kuehnel et al. .............. | 455/41.2 |
| 2007/0190939 A1* | 8/2007 | Abel ........................... | 455/41.2 |
| 2008/0051131 A1* | 2/2008 | Ibrahim et al. ............. | 455/552.1 |

FOREIGN PATENT DOCUMENTS

KR    2006-23857    3/2006

* cited by examiner

*Primary Examiner* — Ping Hsieh
(74) *Attorney, Agent, or Firm* — Cha & Reiter, LLC

(57) ABSTRACT

Disclosed is a method and apparatus for displaying information in a mobile communication terminal using Bluetooth, and more particularly, a method for displaying information about each device to identify the device when searching for devices currently available for Bluetooth communication. The method includes checking whether a content information displaying function is set in a Bluetooth mode of the mobile communication terminal, and acquiring and displaying setting information and content information about devices currently available for Bluetooth communication. The method can discover and identify a device having the desired content by displaying content information about each device when searching for devices capable of performing Bluetooth communication for sharing or exchange of content.

17 Claims, 4 Drawing Sheets

METHOD FOR DISPLAYING INFORMATION IN MOBILE COMMUNICATION TERMINAL USING BLUETOOTH

CLAIM OF PRIORITY

This application claims the benefit of the earlier filing date, pursuant to 35 USC 119, to that patent application entitled "METHOD FOR DISPLAYING INFORMATION IN MOBILE COMMUNICATION TERMINAL USING BLUETOOTH" filed in the Korean Intellectual Property Office on Oct. 9, 2006 and assigned Serial No. 2006-0097748, the contents of which are incorporated herein by reference.

BACKGROUND OF THE INVENTION

1. Field of the Invention

The present invention relates to wireless communication, and more particularly, to a method for displaying information about Bluetooth enabled devices to easily identify the Bluetooth enabled devices when searching for the Bluetooth enabled devices.

2. Description of the Related Art

As technology using low cost, low power wireless device or wireless link has recently have become available, various techniques for wireless communication have been developed and implemented. Bluetooth is a wireless communication standard based on a short-range radio technology. Bluetooth-enabled devices operate in the 2.4 GHz Industrial Scientific Medical (ISM) frequency band and can transfer voice and data within a radius of about 10 m at a maximum rate of 1 Mbps. Due to its low power consumption, Bluetooth modules are being applied to a very wide range of applications. In particular, the Bluetooth module is very often embedded in a mobile communication terminal. A mobile communication terminal with a Bluetooth module requires pairing before communicating with other Bluetooth enabled devices. That is, for each Bluetooth-enabled device to establish a connection with another Bluetooth enabled device, they must be paired with each other.

Pairing is processed in three steps, i.e., authentication, Personal Identification Number (PIN) code exchange and encryption. Authentication is the process of setting whether to exchange a PIN code for connecting with another Bluetooth enabled device. PIN code, which is a password, is exchanged to check whether the same PIN code is used. Encryption is the process of encrypting data being exchanged among Bluetooth enabled devices.

Bluetooth-enabled devices will go through the above three steps for Bluetooth communication with other Bluetooth devices. During paring with another device for Bluetooth communication, a Bluetooth-enabled device first searches for devices, exchanges a PIN code with the devices, and establishes a connection with the devices.

Meanwhile, with the advance of communication technology, a mobile communication terminal provides a plurality of additional functions such as game, alarm, and MP3 playback functions using various images and sounds, as well as communication functions such as phone call and short message service (SMS). Thus, the mobile communication terminal enables users to enjoy various benefits as well as call functions in the content.

A mobile communication terminal may use Bluetooth communication to share MP3 files, ringtones, and images or other content that can be stored therein with another mobile communication terminal.

However, when searching for devices currently available for Bluetooth communication in order to share content stored in another mobile communication terminal, a mobile communication terminal acquires only setting information about each device such as thumbnail image, address, and name. Thus, in order to perform Bluetooth communication with devices containing content desired by a user, the mobile communication terminal has to search for all the available devices and check whether the desired content has been stored on each of the found devices, thus causing user inconvenience.

SUMMARY OF THE INVENTION

An aspect of the present invention is to provide a method for discovering a device containing the desired content when searching for devices capable of performing Bluetooth communication for sharing or exchange of the content.

Another aspect of the present invention is to provide a method for identifying a device having desired content information when searching for devices currently available for Bluetooth communication.

Another aspect of the present invention is to provide a method for performing a game with a device found and identified to have desired content information through Bluetooth communication.

According to an exemplary embodiment of the present invention, there is provided a method for displaying information in a mobile communication terminal, including checking whether a content information displaying function is set in a Bluetooth mode of the mobile communication terminal and acquiring and displaying, if the content information displaying function is set, setting information and content information about devices currently available for Bluetooth communication.

BRIEF DESCRIPTION OF THE DRAWINGS

The above features and advantages of the present invention will be more apparent from the following detailed description in conjunction with the accompanying drawings, in which.

DETAILED DESCRIPTION OF THE INVENTION

Hereinafter, exemplary embodiments of the present invention are described in detail with reference to the accompanying drawings. The term "setting information" used herein means thumbnail image, address, and name of each device acquired by searching for devices currently available for Bluetooth communication. "Content information" refers to content stored by a user in a mobile communication terminal such as game character information, mypet information, ringtones, and photos.

Figure 1:
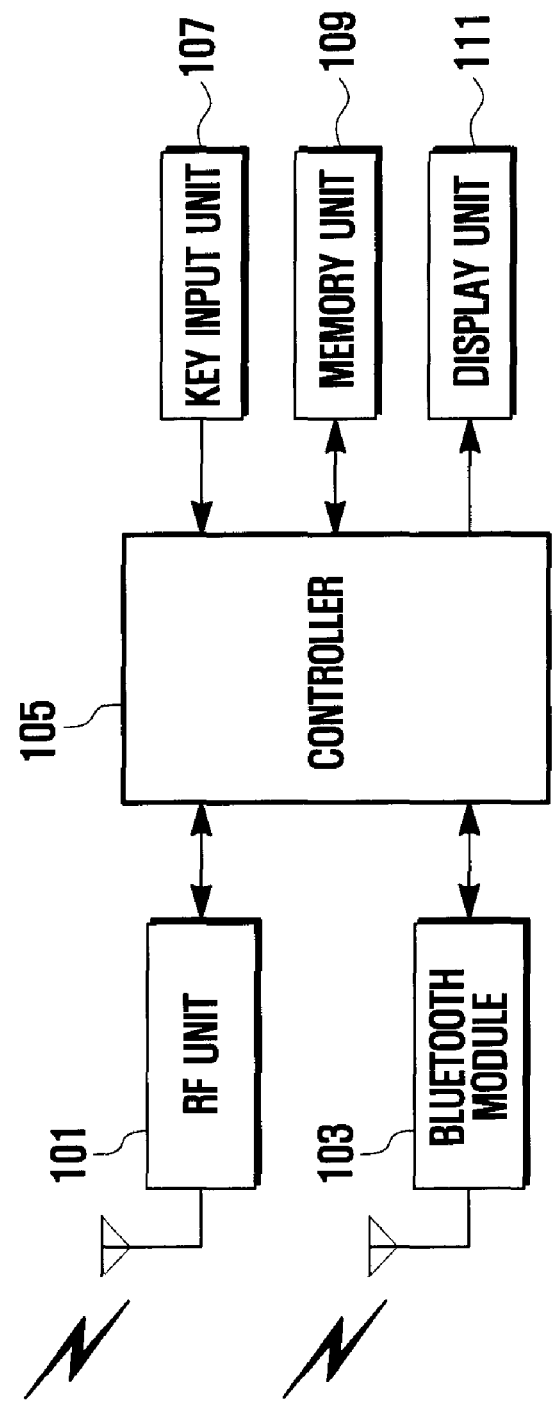
FIG. 1 is a block diagram of a configuration of a mobile communication terminal for displaying information according to an exemplary embodiment of the present invention.

FIG. 1 is a block diagram of a configuration of a mobile communication terminal for displaying information according to an exemplary embodiment of the present invention.

Referring to FIG. 1, the mobile communication terminal has a typical configuration including a radio frequency (RF) unit 101, a Bluetooth module 103, a controller 105, a key input unit 107, a memory unit 109, and a display unit 111.

The RF unit 101 performs communications related to mobile phone communication, short message service (SMS) or multimedia messaging service (MMS) communication, and data communication. The RF unit 101 converts voice/sound data and control data into radio signals for transmission. The RF unit 101 also receives radio signals to convert the radio signals into output voice/sound data and control data. To achieve these functions, the RF unit 101 includes an RF transmitter that up-converts the frequency of a signal being transmitted and amplifies the signal and an RF receiver that low-noise amplifies a received signal and down-converts its frequency.

The Bluetooth module 103 performs operations necessary for sending/receiving control signals and voice signals to and from devices capable of performing Bluetooth communication through a wireless interface. In particular, the Bluetooth module 103 receives control signals from the devices capable of performing Bluetooth communication to deliver the control signals to the controller 105. The Bluetooth module 103 may also analyze the received control signals. In the present embodiment, the Bluetooth module 103 also stores Bluetooth setting information and content information concerning each device.

The controller 105 performs the overall control operation of the mobile communication terminal. The controller 105 may include a data processor having a transmitter that encodes and modulates a signal being transmitted and a receiver that demodulates and decodes a signal being received. In this case, the data processor includes a modulator/demodulator (modem) and a coder/decoder (codec). In the present embodiment, the controller 105 controls pairing, when connecting between Bluetooth enabled devices, as well as Bluetooth communication. The controller 105 also controls the display unit 111 to display content information stored in the memory unit 109 according to the present embodiment.

The key input unit 107 receives a user's manipulation signal for controlling the operation of the mobile communication terminal. According to the present embodiment, the mobile communication terminal may set its content information in Bluetooth setting information through the key input unit 105.

The memory unit 109 includes a program memory for performing mobile communications and a data memory. The program memory stores programs for controlling the general operations of the mobile communication terminal. The memory unit 109 may store information about devices previously connected via Bluetooth communication.

The display unit 111 displays data output from the controller 105. In the present embodiment, the display unit 111 displays content information and setting information about devices found by searching for devices currently available for Bluetooth communication. The display unit 111 may further indicate content information as either public or private according to the present embodiment.

Bluetooth communication is based on a master and slave protocol using time-division duplex (TDD) scheme for communication between a master and a plurality of slaves. Bluetooth uses the TDD to divide the channel into 625 μs time slots. A master can connect up to seven slaves and each of the slaves has an Active Member Address (AM_ADDR) assigned by the master.

Two types of physical links can be established between two or more Bluetooth enabled devices. They are defined as Synchronous Connection-Oriented (SCO) and Asynchronous Connectionless (ACL). The SCO link is used for transmission of voice data and supports circuit switched, symmetric, point-to-point connection between designated master and slave.

The ACL link is used for burst data transmission and supports a packet switched, asymmetric, point-to-multipoint connection between a master device and all slaves participating in the connection. The master can exchange packets with any slave on a per-slot basis.

Figure 2:
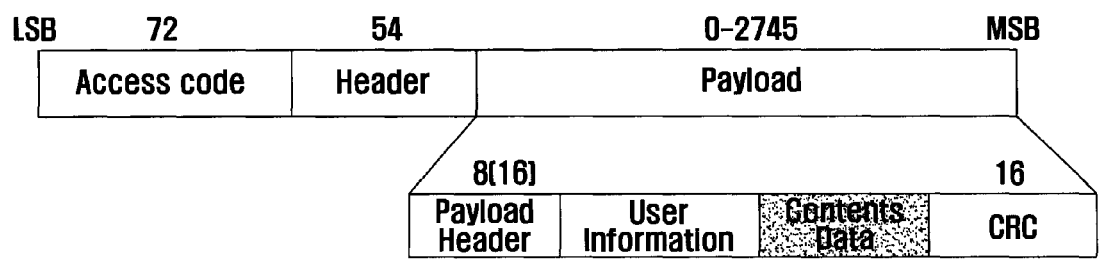
FIG. 2 illustrates the format of a Bluetooth packet formed at a mobile communication terminal for displaying information according to an exemplary embodiment of the present invention.

FIG. 2 illustrates the format of a Bluetooth packet formed at a mobile communication terminal for displaying information according to an exemplary embodiment of the present invention.

Referring to FIG. 2, the Bluetooth packet consists of access code, header, and payload fields.

The access code field having a fixed length of 72 bits is derived from the device address of a master and is unique for a channel. A receiving device compares an input signal with the access code of a received packet, if the input signal doesn't coincide with the access code, the received packet is not regarded as valid and is ignored. The access code is used for identifying packets, synchronization, and offset compensation.

The header field is a 52 bit field that is divided into several subfields: active member address (AM_ADD) field, type field, flow field, acknowledge number (ARQN) field, sequence number (SEQN) field, and a header error check (HEC) field.

The payload field has a variable length from 0 to 2745 bits containing voice data or other data. The payload field contains a payload header, user information, and cyclic redundancy check (CRC). The size of the payload field may vary depending on the size of data contained therein. According to the present embodiment, the payload field may further contain content data as illustrated in FIG. 2.

Figure 3:
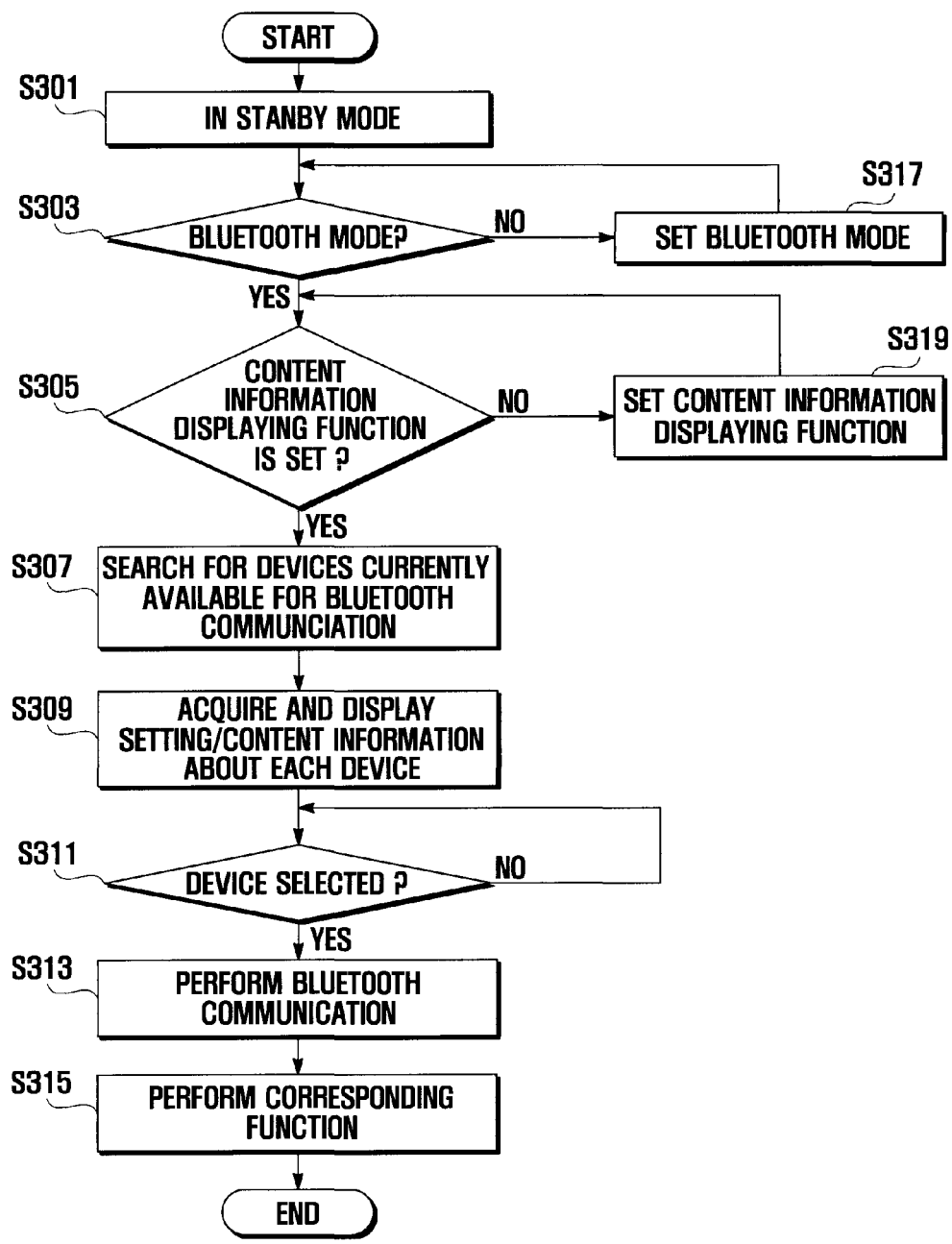
FIG. 3 is a flowchart illustrating operation of a mobile communication terminal for displaying information according to an exemplary embodiment of the present invention.
Figure 4:
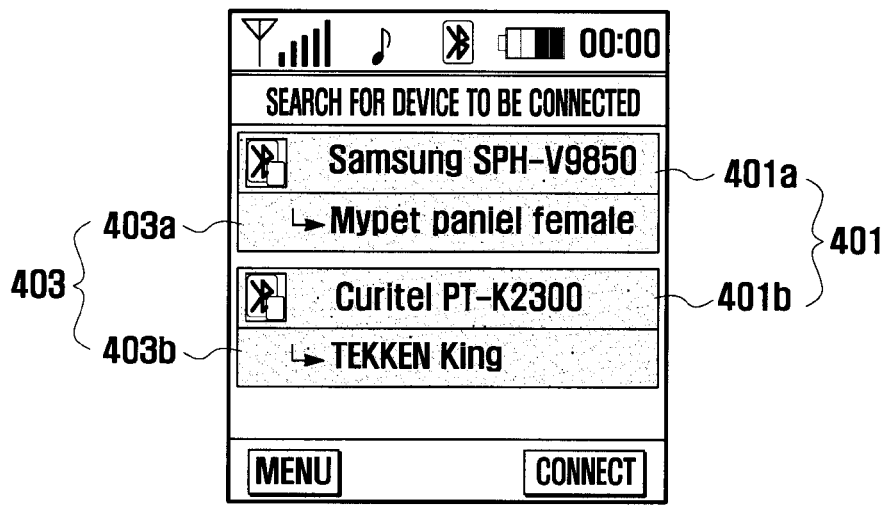
FIG. 4 illustrates a process for displaying information about a device available for communication in a mobile communication terminal according to an exemplary embodiment of the present invention.
Figure 5:
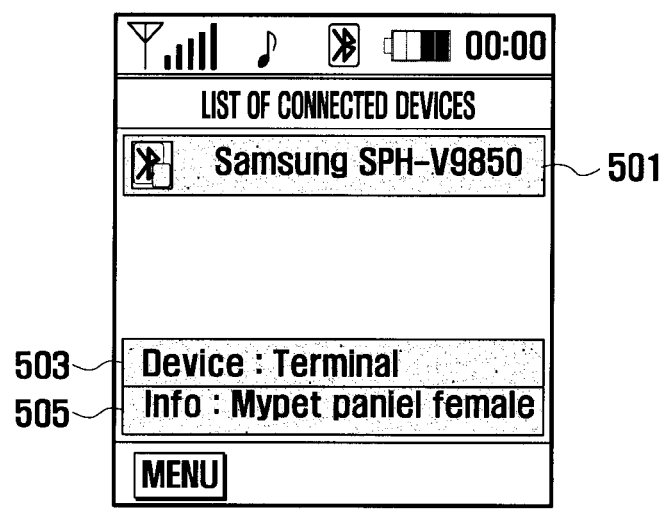
FIG. 5 illustrates a process of displaying information stored in a mobile communication terminal according to an exemplary embodiment of the present invention.

A method for displaying information in a mobile communication terminal using Bluetooth is described in detail with reference to FIGS. 3 through 5. FIG. 3 is a flowchart illustrating operation of a mobile communication terminal for displaying information according to an exemplary embodiment of the present invention. FIG. 4 illustrates a process of displaying information about a device available for communication in a mobile communication terminal according to an exemplary embodiment of the present invention. FIG. 5 illustrates a process of displaying information stored in a mobile communication terminal according to an exemplary embodiment of the present invention.

Referring to FIGS. 1 and 3, first, while in a standby mode (S301), the controller 105 checks or determines whether the mobile communication terminal is in a Bluetooth mode (S303). If the mobile communication terminal is not in a Bluetooth mode (S303), the controller 105 controls the key input unit 107 to set a Bluetooth mode (S317).

If the mobile communication terminal is in a Bluetooth mode, the controller 105 checks whether a content information displaying function is set (S305). The feature of the present invention is such that the mobile communication terminal supports a content information displaying function. If the content information displaying function is set at step S305, it is possible to acquire and display content information stored in mobile communication terminals when searching for devices currently available for Bluetooth communication. As described above, content information is contained in a payload field of a Bluetooth packet. Conversely, if the content information displaying function is not set, the controller 105 controls the key input unit 107 to set the content information displaying function (S319).

If the content information displaying function is set in the mobile communication terminal, the controller 105 searches for devices available for Bluetooth communication (S307). That is, the controller 105 searches for devices within a designated short range that can exchange content with each other.

The controller 105 then acquires setting information and content information about the devices found in step S307 and controls the display unit 111 to display the acquired setting information and content information (S309). Referring to FIG. 4, setting information and content information about devices to be Bluetooth-connected are displayed on the display unit 111. Typically, thumbnail images and names 401*a* and 401*b*, respectively, of devices found are acquired and displayed. In the present embodiment, the display unit 111 further displays content information 403*a* and 403*b* concerning the available devices.

Thereafter, the controller 105 checks whether a device having desired content information is selected through the key input unit 107 (S311). If a device is selected, the controller 105 proceeds to enable Bluetooth communication with the selected device (S313). The controller 105 then performs a function corresponding to the desired content information with the selected device (s315). For example, if another mobile communication terminal having information 403*a* regarding pets (mypet) is selected for Bluetooth communication, the mobile communication terminal may exchange content information about pets (e.g., mating habits) stored therein with the other mobile communication terminal. As another example, if a mobile communication terminal containing game character information 403*b* is selected for Bluetooth communication, the mobile communication terminal may perform a game with the selected mobile communication terminal using game character information stored therein and the game character information 403*b*.

Meanwhile, if the controller 105 recognizes that the content information displaying function is set at step S305, the controller 105 may check whether setting information and content information about a device previously connected via Bluetooth communication has been stored in the memory unit 109. In this case, if such information has not been stored therein, the controller 105 performs the step S307 by searching for devices capable of performing Bluetooth communication.

If the setting information and the content information about the previously Bluetooth-connected device have been stored, the controller 105 controls the display unit 111 to display the stored information. Referring to FIG. 5, setting information and content information about a previously Bluetooth-connected 20 device is displayed on the display unit 111. That is, the display unit 111 displays a thumbnail image, a name 501 and a type 503 of the previously connected device, and content information 505 stored in the device.

The controller 105 then checks whether to perform Bluetooth communication with the displayed device. If the displayed device is selected, the controller 105 performs the step S313 by performing Bluetooth communication with the selected device. If the displayed device is not selected, the process returns to the step S307.

When checking whether the content information displaying function is set at step S305, the controller 105 may control the key input unit 107 to further set the content information either as being available to the public (public) or not available (private). When the content information is set public, both the setting information and content information about the mobile communication terminal can be acquired by another device. However, if the content information is set private, only setting information about the mobile communication terminal can be acquired by another device, as performed conventionally, thus enabling protection of the content information.

As described above, unlike a conventional method that enables content information to be identified after pairing for sharing or exchange of content, a method for displaying information in a mobile communication terminal using Bluetooth according to the present invention allows discovery of a device containing the desired content by displaying content information about each device when searching for devices capable of performing Bluetooth communication for sharing or exchange of content. Thus, the present invention can identify the desired content information. The present invention also enables sharing and exchange of a device having the desired content as well as performance of a game with a device having the desired content using Bluetooth communication.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

While the present invention has been particularly shown and described with reference to embodiments thereof, it will be understood by those of ordinary skill in the art that various changes and modifications in form and details may be made without departing from the spirit and scope of the present invention as defined by the following claims.

What is claimed is:

1. A method for displaying information in a mobile communication terminal, the method comprising the steps of:
   determining whether a content information displaying function is set in a Bluetooth mode of the mobile communication terminal; and
   acquiring and displaying via Bluetooth, when the content information displaying function is set, both setting information and content information about one or more unknown devices that are not paired with the mobile communication terminal and currently available for Bluetooth communication in which a respective content information displaying function is set, the content information being related to contents stored in the one or more unknown devices and the content information additionally identified as either public or private content information via the displaying function so that public content information can be identified without performing pairing via Bluetooth, and
   performing the Bluetooth communication by pairing with a device selected from among the displayed unknown devices after it is determined that a particular public content information in at least one of the displayed devices matches a desired content information.

2. The method of claim 1, wherein the content information comprises game character information, ringtone information, and photo information stored in the mobile communication terminal.

3. The method of claim 1, wherein the content information is contained in a payload field of a Bluetooth packet.

4. The method of claim 1, wherein the step of determining whether the content information displaying function is set comprises the steps of:
determining whether content information and setting information about a device have been stored in the mobile communication terminal;
displaying, if the setting information and the content information about the previously Bluetooth connected device has been stored therein; and
determining whether to perform Bluetooth communication with the previously Bluetooth-connected device.

5. The method of claim 1, wherein the step of determining whether the content information displaying function is set comprises the step of:
setting the content information either public or private.

6. The method of claim 5, wherein both the setting information and the content information are displayed when the content information is set public.

7. The method of claim 5, wherein setting information is displayed when the content information is set to private.

8. The method of claim 1, wherein in performing the Bluetooth communication with the selected device, a game is performed using content possessed by the selected device.

9. A mobile communication terminal comprising:
a display;
a processor in communication with a memory, the processor executing code for:
setting a content information displaying function; and
acquiring by communication via a Bluetooth module setting information and content information about one or more devices that are not paired with the mobile communication terminal and currently available for Bluetooth communication in which a respective content information displaying function is set, the content information being related to contents stored in the one or more unknown devices and the content information additionally identified as either public or private content information via the displaying function so that public content information can be identified without performing pairing via Bluetooth, and
performing the Bluetooth communication by the mobile communication terminal with a device selected from among unpaired displayed devices when it is determined that a particular public content information in at least one of the unpaired displayed unknown devices matches a desired content information; and
said display being in communication with the processor for displaying the acquired setting information and content information when acquired by the Bluetooth module.

10. The terminal of claim 9, wherein the content information comprises game character information, ringtone information, and photo information stored in terminal.

11. The terminal of claim 9, wherein the content information is contained in a payload field of a Bluetooth packet.

12. The terminal of claim 9, wherein the processor further executing the steps of:
determining whether content information and setting information about a device have been stored in the terminal; and
displaying the stored information.

13. The terminal of claim 9, further comprising:
means for setting the content information either public or private.

14. The terminal of claim 13, wherein the setting information and the content information is displayed when the content information is set public.

15. The terminal of claim 13, wherein setting information is displayed when the content information is set to private.

16. The terminal of claim 9, wherein in performing the Bluetooth communication with the selected device, a game is performed using content possessed by the selected device.

17. A computer-program comprising machine readable executable code on a non-transitory machine readable medium for providing instruction, which when loaded into a processor, causing the processor to execute the steps of:
determining by the processor whether a content information displaying function is set in a Bluetooth mode of a mobile communication terminal;
acquiring by communication via a Bluetooth Module setting information and content information about one or more unknown devices currently that are not paired with the mobile communication terminal and available for Bluetooth communication in which a respective content information displaying function is set the content information being related to contents stored in the one or more unknown devices and the content information additionally identified as either public or private content information via the displaying function so that public content information can be identified without performing pairing via Bluetooth,
displaying the setting information and content information on a display unit of the mobile communication terminal; and
performing the Bluetooth communication by the mobile communication terminal with a device selected from among unpaired displayed unknown devices when it is determined that a particular public content information in at least one of the unpaired displayed unknown devices matches a desired content information.

* * * * *